US010414235B1

(12) United States Patent
Yassan (10) Patent No.: US 10,414,235 B1
(45) Date of Patent: Sep. 17, 2019

(54) SYSTEM AND METHOD FOR VEHICLE WATER INGRESS PROTECTION

(71) Applicant: Faraday&Future Inc., Gardena, CA (US)

(72) Inventor: Mohammadreza Yassan, Rancho Palos Verdes, CA (US)

(73) Assignee: FARADY & FUTURE INC., Gardena, CA (US)

( * ) Notice: Subject to any disclaimer, the term of this patent is extended or adjusted under 35 U.S.C. 154(b) by 0 days.

(21) Appl. No.: 16/054,919

(22) Filed: Aug. 3, 2018

(51) Int. Cl.
| | | |
|---|---|---|
| *B60Q 1/00* | (2006.01) | |
| *B60G 17/0165* | (2006.01) | |
| *B60G 17/019* | (2006.01) | |
| *B60G 17/0195* | (2006.01) | |
| *G08B 21/20* | (2006.01) | |
| *B60W 50/14* | (2012.01) | |
| *G01S 15/93* | (2006.01) | |

(52) U.S. Cl.
CPC ....... *B60G 17/0165* (2013.01); *B60G 17/019* (2013.01); *B60G 17/0195* (2013.01); *B60W 50/14* (2013.01); *G08B 21/20* (2013.01); *B60G 2300/50* (2013.01); *B60G 2400/82* (2013.01); *B60G 2500/30* (2013.01); *B60G 2800/914* (2013.01); *B60T 2210/10* (2013.01); *B60W 2050/146* (2013.01); *B60W 2420/54* (2013.01); *B60W 2550/14* (2013.01); *G01S 2015/938* (2013.01)

(58) Field of Classification Search
CPC .......... B60C 17/0165; G01S 2015/938; G01S 11/12; G01S 5/16

USPC .......... 340/438, 435, 436, 517, 521, 539.12, 340/612, 618, 621
See application file for complete search history.

(56) References Cited

U.S. PATENT DOCUMENTS

| | | | |
|---|---|---|---|
| 7,522,475 B2 * | 4/2009 | Kojima | .................. G01S 7/521 367/138 |
| 9,302,586 B2 | 4/2016 | Tran et al. | |
| 9,533,575 B2 | 1/2017 | Tran et al. | |
| 9,810,778 B2 * | 11/2017 | Koudar | .............. G01S 7/52004 |
| 9,968,966 B2 * | 5/2018 | Gerlach | ................ B06B 1/0655 |
| 2014/0085066 A1 | 3/2014 | Tran et al. | |
| 2015/0033846 A1 | 2/2015 | Tran et al. | |
| 2019/0079174 A1 * | 3/2019 | Kutej | .................. G01S 7/52004 |

* cited by examiner

*Primary Examiner* — Toan N Pham
(74) *Attorney, Agent, or Firm* — Morrison & Foersters LLP (57) ABSTRACT

A system for use in a vehicle, the system comprising sensors located on the front and back fascia of the vehicle; processors coupled to the sensors; and a memory including instructions, which when executed by the processors, cause the processors to perform a method. The method comprising detecting a change in first acoustic impedance at a first sensor while detecting a change in second acoustic impedance at a second sensor. In accordance with a determination that the change in first acoustic impedance and the second acoustic impedance are between a threshold range for at least a threshold period of time, the method executing a precautionary measure. In accordance with a determination that the change in first acoustic impedance and the change in second acoustic impedance are not between the threshold range for at least the threshold period of time, the method forgoing executing the precautionary measure.

20 Claims, 6 Drawing Sheets

SYSTEM AND METHOD FOR VEHICLE WATER INGRESS PROTECTION

FIELD OF THE DISCLOSURE

This relates generally providing water ingress protection to vehicles.

BACKGROUND OF THE DISCLOSURE

While not recommended, vehicles, especially automobiles, are sometimes driven through extreme weather conditions. For example, vehicles are sometimes driven through heavy rain and/or in flooded areas (e.g., flooded roads, intersections, etc.). This can result in water entering the vehicle (e.g., the engine area, cabin, and/or trunk) and damaging the vehicle. This can be particularly true for electric and/or hybrid vehicles. Therefore, a solution to prevent water ingress in vehicles can be desirable.

SUMMARY OF THE DISCLOSURE

Examples of the disclosure are directed to vehicle water ingress protection. Vehicles, especially automobiles, increasingly include various systems and sensors. For example, many vehicles today include ultrasonic sensors (e.g., park sensors) to help detect objects in front or behind the vehicle (e.g., for object avoidance) to assist with driving maneuvers (e.g., driving or parking operations). A system in accordance with a preferred embodiment of the present invention utilizes these common ultrasonic sensors found on vehicles to detect a flood concern (e.g., elevated water levels that can pose danger to the driver and/or the vehicle). In accordance with one embodiment, the system determines when there is a flood concern when a significant change in acoustic impedance is detected at two (as two points define a line or in this case a level of water the vehicle is being subjected to) or more of ultrasonic sensors between a first threshold value and a second threshold value (e.g., between 1 and 2 MPa-s/m$^3$ or between any other range including the expected acoustic impedance of water (e.g., 1.48 MPa-s/m$^3$)) for a threshold period of time (e.g., four seconds or any other period of time). In the preferred embodiment, the system takes precautionary measures to avoid damage to the vehicle when a flood concern is detected. In some embodiments, the system will take one or more further precautionary measures when a flood concern is detected for an extended period of time. By determining a flood concern and taking precautionary measures, the system can prevent water from entering the vehicle (e.g., into the engine area and/or the cabin). In this way, the system can help prevent water damage to the vehicle and/or harm to vehicle passengers.

DETAILED DESCRIPTION

In the following description of examples, references are made to the accompanying drawings that form a part hereof, and in which it is shown by way of illustration specific examples that can be practiced. It is to be understood that other examples can be used and structural changes can be made without departing from the scope of the disclosed examples. Further, in the context of this disclosure, "autonomous driving" (or the like) can refer to fully autonomous driving, partially autonomous driving, and/or driver assistance systems.

Examples of the disclosure are directed to vehicle water ingress protection. Vehicles, especially automobiles, increasingly include various systems and sensors. For example, many vehicles today include ultrasonic sensors (e.g., park sensors) to help detect objects in front or behind the vehicle (e.g., for object avoidance) to assist with driving maneuvers (e.g., driving or parking operations). A system in accordance with a preferred embodiment of the present invention utilizes these common ultrasonic sensors found on vehicles to detect a flood concern (e.g., elevated water levels that can pose danger to the driver and/or the vehicle). In accordance with one embodiment, the system determines when there is a flood concern when a significant change in acoustic impedance is detected at two (as two points define a line or in this case a level of water the vehicle is being subjected to) or more of ultrasonic sensors between a first threshold value and a second threshold value (e.g., between 1 and 2 MPa-s/m$^3$ or between any other range including the expected acoustic impedance of water (e.g., 1.48 MPa-s/m$^3$)) for a threshold period of time (e.g., four seconds or any other period of time). In the preferred embodiment, the system takes precautionary measures to avoid damage to the vehicle when a flood concern is detected. In some embodiments, the system will take one or more further precautionary measures when a flood concern is detected for an extended period of time. By determining a flood concern and taking precautionary measures, the system can prevent water from entering the vehicle (e.g., into the engine area and/or the cabin). In this way, the system can help prevent water damage to the vehicle and/or harm to vehicle passengers.

Figure 1:
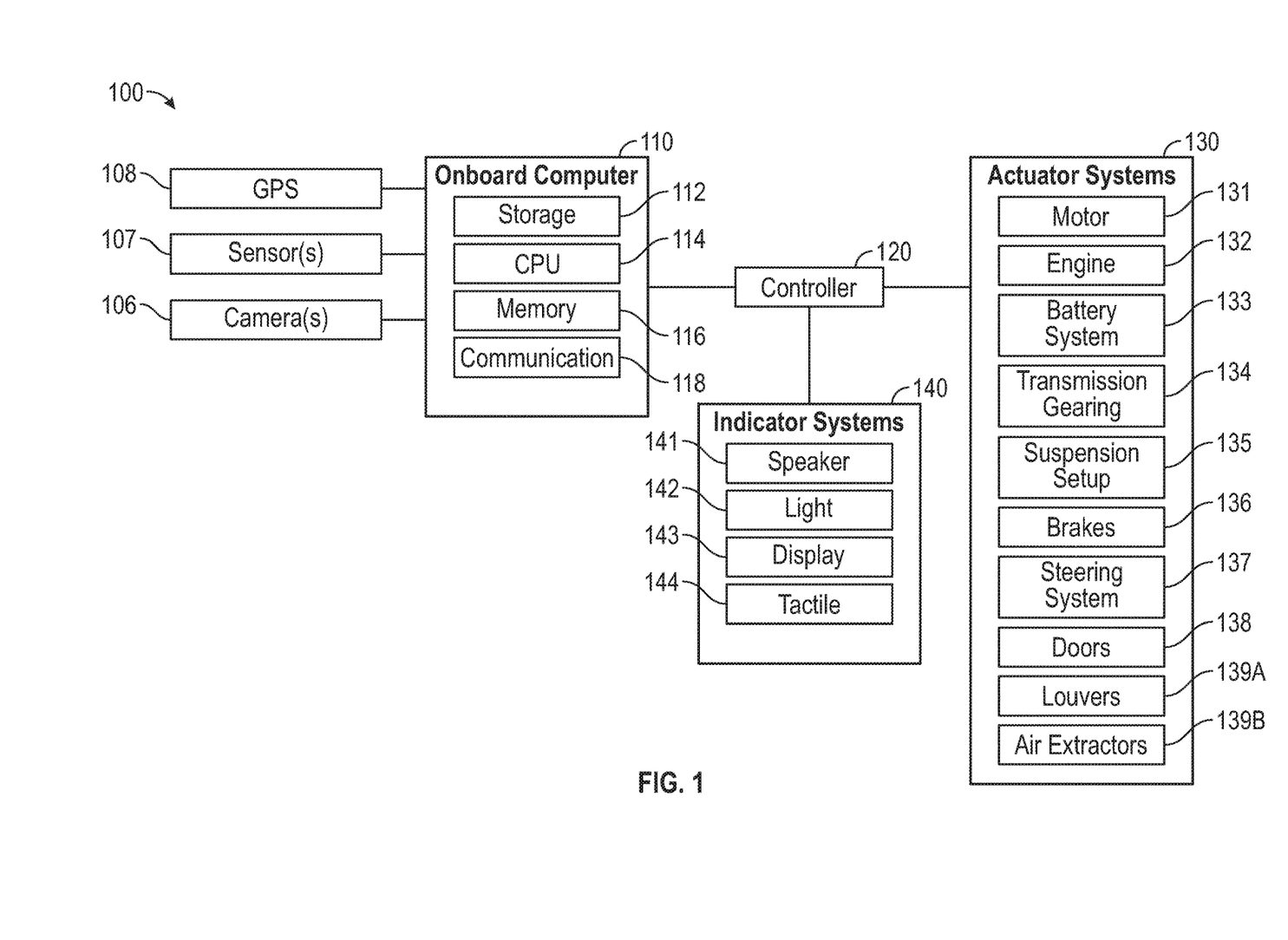
FIG. 1 illustrates a system block diagram of a vehicle control system according to examples of the disclosure.

FIG. 1 illustrates a system block diagram of vehicle control system 100 according to examples of the disclosure. Vehicle control system 100 can perform each of the methods described with reference to FIGS. 2-5. Vehicle control system 100 can be incorporated into a vehicle, such as a consumer automobile. Other examples of vehicles that may incorporate the vehicle control system 100 include, without limitation, airplanes, boats, or industrial automobiles. In accordance with an embodiment, vehicle control system 100 includes one or more cameras 106 for determining one or more characteristics about the vehicle's surroundings and/or interior, as described below with reference to FIGS. 2-5. Vehicle control system 100 can also include one or more sensors 107 (e.g., ultrasonic, radar, laser, LIDAR, accelerometer, gyroscope, pressure, temperature, speed, air flow, or smoke) and a Global Positioning System (GPS) receiver 108 for detecting various characteristics about the vehicle and about the vehicle's surroundings. In some examples, sensor data can be fused (e.g., combined) at one or more electronic control units (ECUs) (not shown). The particular ECU(s) that are chosen to perform data fusion can be based on an amount of resources (e.g., processing power and/or memory) available to the one or more ECUs, and can be dynamically shifted between ECUs and/or components within an ECU (since an ECU can contain more than one processor) to optimize performance.

A vehicle control system 100 according to an embodiment of the present invention can include an onboard computer 110 that is coupled to cameras 106, sensors 107, and GPS receiver 108, and that is capable of receiving the image data from the cameras and/or outputs from the sensors 107, and the GPS receiver 108. Onboard computer 110 can include storage 112, memory 116, communications interface 118 (e.g., a cellular internet interface, a Wi-Fi internet interface, vehicle-to-vehicle interface, radio interface, or any other wireless communication interface), and a processor 114. Processor 114 can perform any of the methods described with reference to FIGS. 2-5. Additionally, communications interface 118 can perform any of the communications described with reference to FIGS. 2-5. Moreover, storage 112 and/or memory 116 can store data and instructions for performing any or all of the methods described with reference to FIGS. 2-5. Storage 112 and/or memory 116 can be any non-transitory computer-readable storage medium, such as a solid-state drive or a hard disk drive, among other possibilities. In accordance with one embodiment, the vehicle control system 100 includes a controller 120 capable of controlling one or more aspects of vehicle operation, such as performing autonomous or semi-autonomous driving maneuvers.

In some examples, vehicle control system 100 is electrically connected (e.g., via controller 120) to one or more actuator systems 130 in the vehicle and one or more indicator systems 140 in the vehicle. The one or more actuator systems 130 can include, but are not limited to, a motor 131, engine 132, battery system 133, transmission gearing 134, suspension setup 135, brakes 136, steering system 137, door system 138, louvers 139A, and air extractors 139B. Vehicle control system 100 controls, via controller 120, one or more of these actuator systems 130 during vehicle operation; for example, to raise or lower the ride height (e.g., the suspension height) using the suspension setup 135, to open or close louvers 139A, to open or close cabin air-extractors 139B, to open or close one or more doors of the vehicle using the door actuator system 138, to control the vehicle during autonomous driving operations, using the motor 131 or engine 132, battery system 133, transmission gearing 134, suspension setup 135, brakes 136, and/or steering system 137, etc. According to one embodiment, actuator systems 130 includes sensors that send dead reckoning information (e.g., steering information, speed information, etc.) to on-board computer 110 (e.g., via controller 120) to estimate the vehicle's location and heading. The one or more indicator systems 140 can include, but are not limited to, one or more speakers 141 in the vehicle (e.g., as part of an entertainment system in the vehicle), one or more lights 142 in the vehicle, one or more displays 143 in the vehicle (e.g., as part of a control or entertainment system in the vehicle), and one or more tactile actuators 144 in the vehicle (e.g., as part of a steering wheel or seat in the vehicle). Vehicle control system 100 can control, via controller 120, one or more of these indicator systems 140 to provide indications to a driver.

Figure 2:
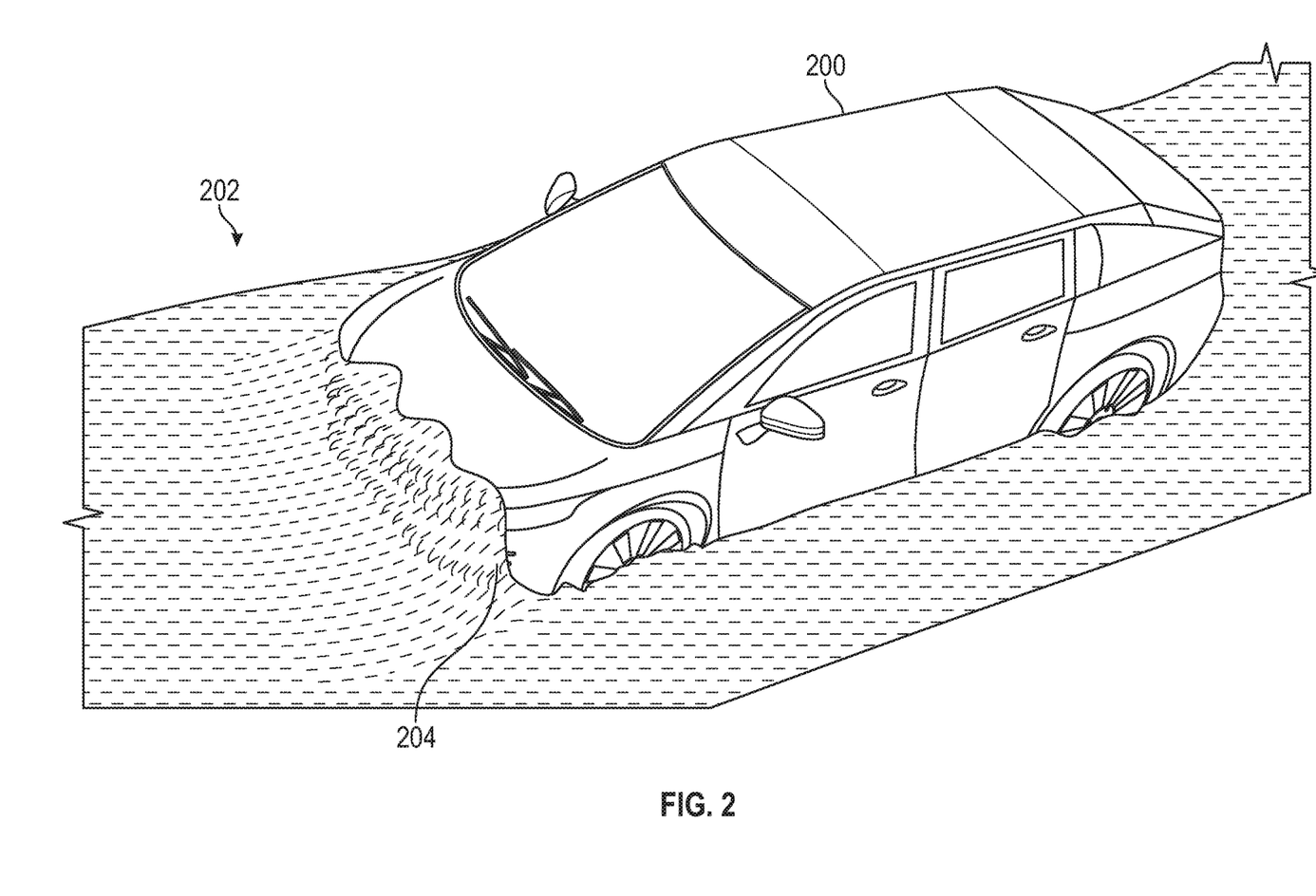
FIG. 2 illustrates a vehicle navigating along a flooded road according to examples of the disclosure.

FIG. 2 illustrates vehicle 200 navigating along flooded road 202 according to examples of the disclosure. As vehicle 200 drives forward, water 204 dams (e.g., accumulates or rises) at the front of the vehicle and reaches a higher elevation than the rear of the vehicle. Water 204 can reach higher levels the faster the vehicle travels. This can cause water 204 to rise to an elevation that may cause damage to the vehicle. If no precautionary measures are taken, water 204 can enter the engine area of the vehicle and/or the cabin of the vehicle and cause damage to the vehicle and/or vehicle passengers. For example, water, debris and/or mud carried by and mixed-in water can enter the engine area and damage engine components (e.g., oil cooler, radiator, condenser, or any other engine component), enter the cabin and cause harm to vehicle passengers or damage the interior of the car, including electronic components (e.g., heating ventilation & air conditioning (HVAC) systems, low voltage electronics, displays, interior lighting, speakers, or any vehicle control or entertainment system components), or enter any other part of the vehicle and cause water damage.

Figure 3A:
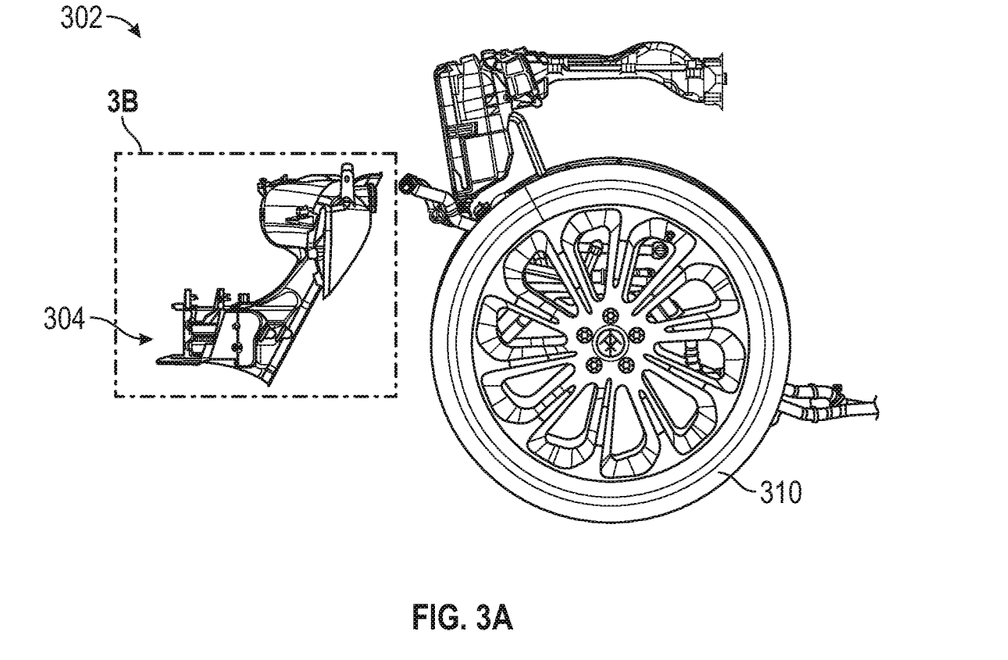
FIGS. 3A-3B illustrate internal components of the vehicle thermal system according to examples of the disclosure.
Figure 3B:
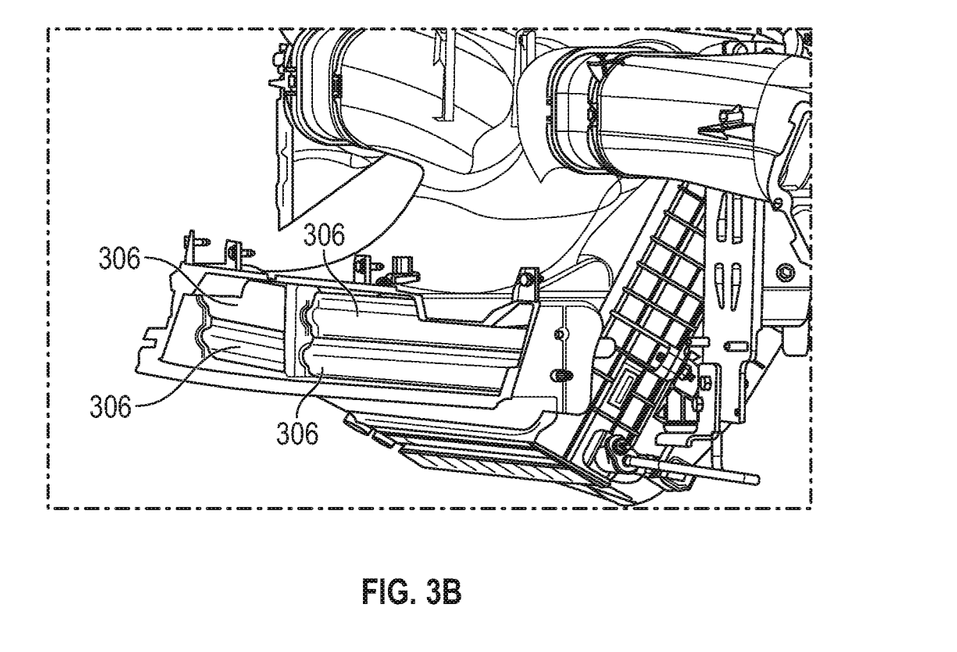

FIGS. 3A-3B illustrate internal vehicle components according to examples of the disclosure. In this example, FIG. 3A shows a side view of a vehicle's internal engine area 302. As illustrated, the vehicle's engine area 302 can include includes openings 304 (e.g., vents) that allow air to pass into the engine area (e.g., into the vehicle's thermal system 308). Typically, openings 304 are located at a height equal to about the center of the vehicles tires 310 (e.g., about 340 mm from the ground). FIG. 3B illustrates a perspective view of engine area 302. As shown in FIG. 3B, vents 304 can include louvers 306. In some embodiments, the vehicle's onboard computer can cause louvers 306 to open or close (e.g., as described above with reference to FIG. 1). When the vehicle is driven through a flooded area, openings 304 (e.g., when louvers 306 are open) can allow water to enter the engine area and cause damage to engine components, such as the vehicle's thermal system 308 or other engine components located behind openings 304 (e.g., as shown in FIG. 3B). For example, water, debris and/or mud carried by and mixed-in water can enter through openings 304 and cause blockage in heat exchanger cores (e.g., in the oil cooler, radiator, condenser), which reduces thermal system efficiency and/or causes the vehicle to overheat and potentially damage thermal system 306 and/or other engine components. In some examples, water can also enter the cabin area or any other area of the vehicle and damage the vehicle and/or cause harm to passengers.

Figure 4A:
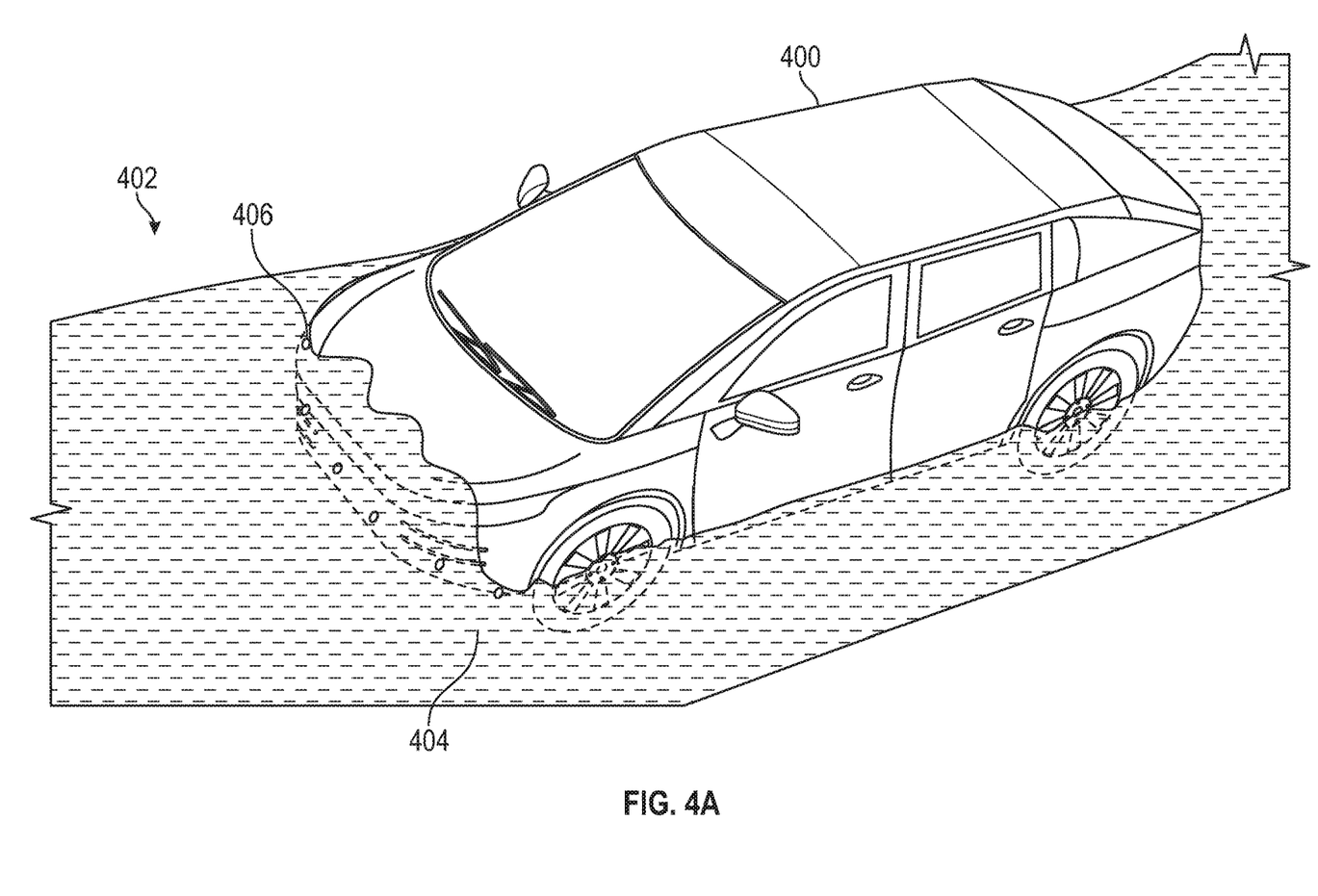
FIGS. 4A-4B illustrate ultrasonic sensors configured on a vehicle according to examples of the disclosure.
Figure 4B:
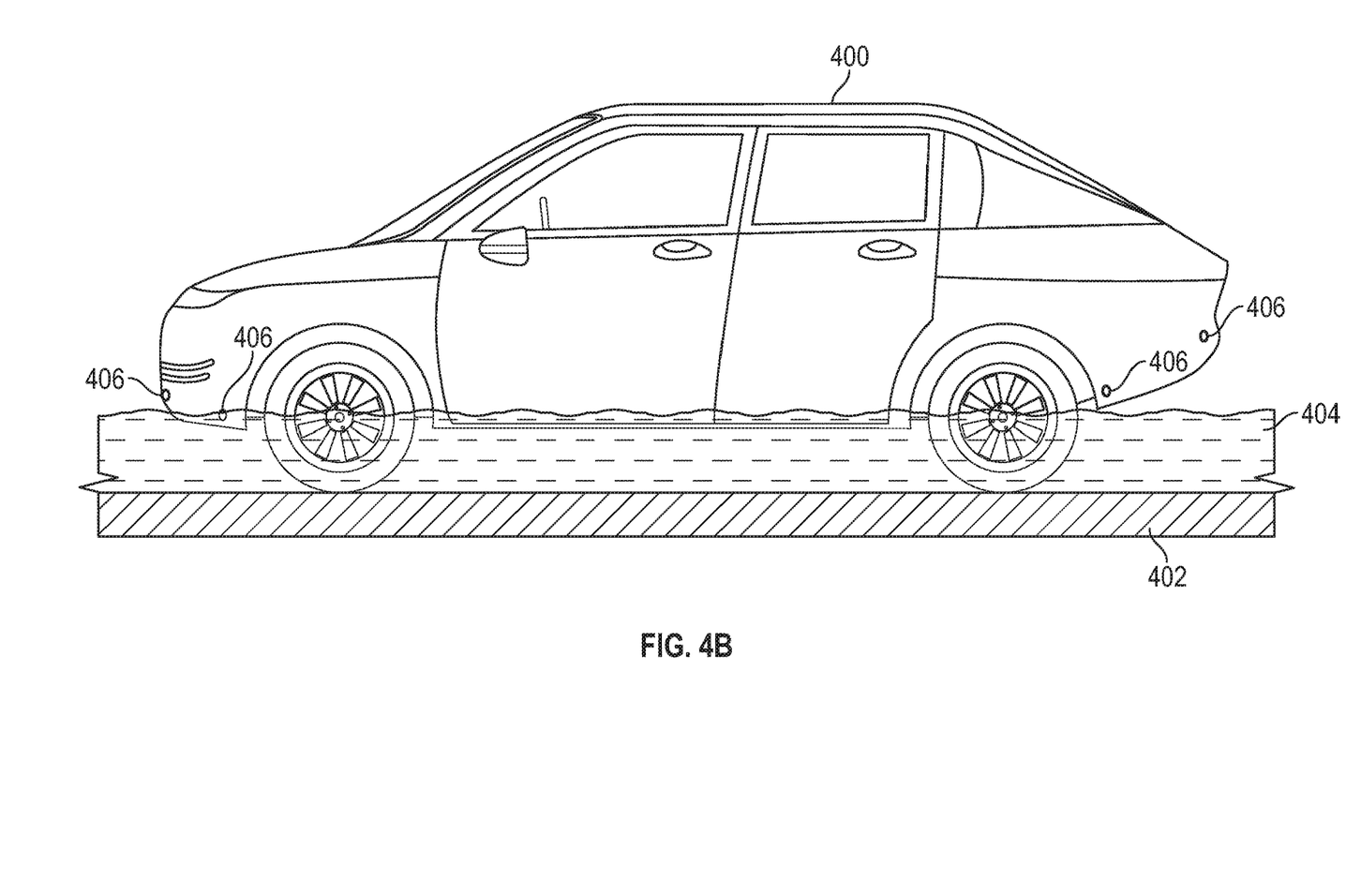

FIGS. 4A-4B illustrate vehicle 400 navigating along flooded road 402 according to examples of the disclosure. In some embodiments, vehicle 400 includes one or more sensors and systems for determining one or more characteristic about the vehicle's surroundings (e.g., as described above with references to FIGS. 1-2). These sensors can include ultrasonic sensors, LIDAR sensors, cameras (e.g., stereo-cameras, mono-cameras), radar sensors, laser sensors, and/or any other sensors that can be used to detect one or more characteristics about the vehicle's surroundings. These sensors can be configured on vehicle 400 to provide it with 360 degree (or other) coverage of the area surrounding the vehicle. For example, the vehicle's onboard computer can process data from one or more of these sensors to detect structures, other vehicles, pedestrians, or any other object.

In the preferred embodiment, vehicle 400 includes sensors 406 (e.g., at the front and back bumper fascia of the vehicle as shown in FIGS. 4A-4B). For example, sensors 406 can be the ultrasonic sensors found in many vehicles that aid in driving and parking maneuvers (e.g., for object avoidance) (e.g., park pilot sensors). As shown in FIG. 4B, sensors 406 can be positioned at the front and/or back bumper of vehicle 400. In some examples these sensors can be positioned at the same or at different heights on the vehicle. These sensors detect and determine the distance of an object by transmitting a high-frequency sound pulse and measure the time it takes for the sound pulse to echo back from the object to the sensor. These sensors can also be used to characterize the acoustic impedance of any medium through which they travel substance and material, or object in front of it. For example, the acoustic impedance of air is about 0.0004 MPa-s/m$^3$, the acoustic impedance of water is about 1.48 MPa-s/m$^3$, and the acoustic impedance of steel is about 39 MPa-s/m$^3$. Detecting substantially the same acoustic impedance at two or more sensors 406 suggests that the same substance is in front of the two or more sensors. Therefore, detecting the expected acoustic impedance of water (about 1.48 MPa-s/m$^3$) at two or more sensors 406 suggests that the two or more sensors 406 are submerged or covered in water, as shown in FIG. 4A. A vehicle's onboard computer can therefore determine a flood concern (e.g., detect when two or more sensors 406 are submerged or covered in water) when detecting acoustic impedance at two or more of sensors 406 between a first threshold value and a second threshold value (e.g., between 1 and 2 MPa-s/m$^3$ or between any other range including the expected acoustic impedance of water (e.g., 1.48 MPa-s/m$^3$)) for a threshold period of time (e.g., four seconds or any other period of time). In some examples, the flood concern can be indicative of a flooded, extreme water condition (e.g., heavy rain, taking the vehicle through a car wash, etc.), or any water condition that can pose danger to the vehicle and/or its passengers.

In some embodiments, vehicle 400 optionally includes at least one or more of the Global Navigation Satellite Systems (GNSS) (e.g., GPS, BeiDou, Galileo, etc.), inertial navigation systems (INS) (e.g., inertial guidance systems, inertial instruments, inertial measurement units (IMU)), and/or sensors (e.g., accelerometers, gyroscopes, magnetometers) for determining the vehicle's location and/or heading (e.g., as described above with references to FIG. 1). In this way, vehicle 400 can determine the location of a flood concern.

Figure 5:
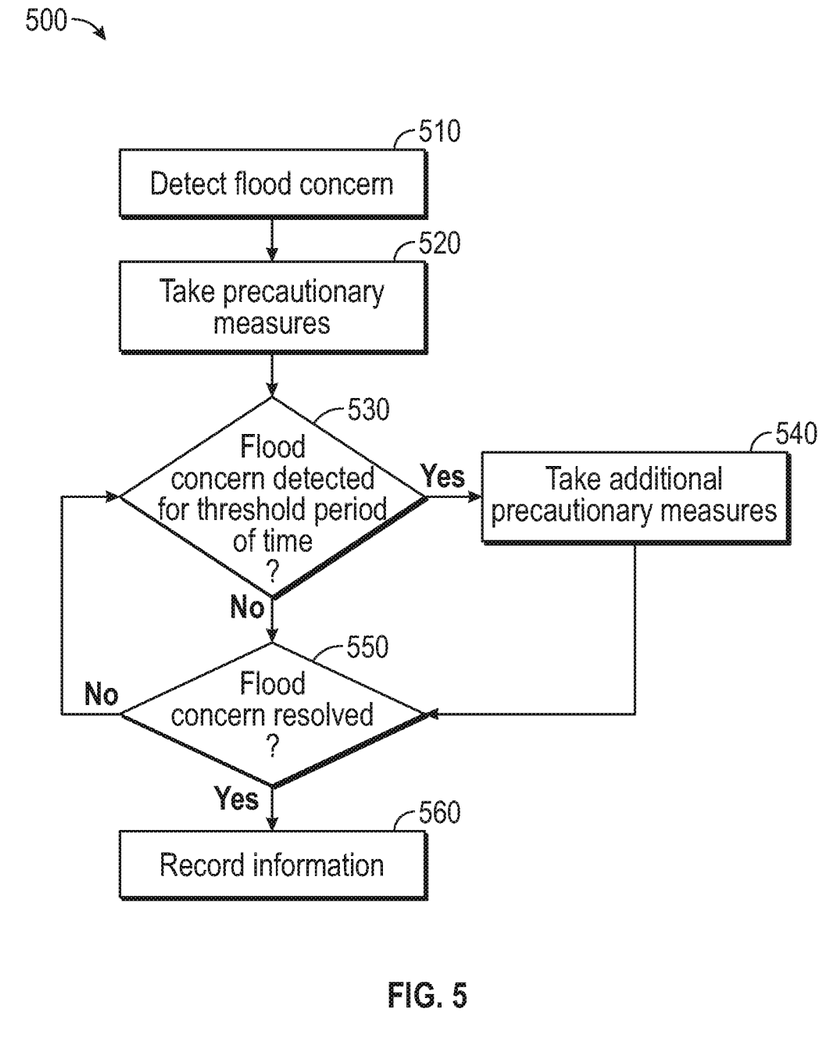
FIG. 5 illustrates a process for vehicle water ingress protection according to examples of the disclosure.

FIG. 5 illustrates process 500 for vehicle water ingress protection according to examples of the disclosure. At step 510 a flood concern for a vehicle is detected. In one embodiment, a flood concern is detected when acoustic impedance at two or more sensors is detected between a first threshold value and a second threshold value (e.g., between 1 and 2 MPa-s/m$^3$ or between any other range including the expected acoustic impedance of water (e.g., 1.48 MPa-s/m$^3$)) for a threshold period of time (e.g., four seconds or any other period of time) (e.g., as described above with reference to FIGS. 4A-4B). In some examples, the flood concern corresponds to water levels at or above the two or more sensors of the vehicle (e.g., a flood). In other examples, the flood concern corresponds to extreme water conditions (e.g., heavy rain, driving the vehicle through a car wash, etc.). In the preferred embodiment, the two or more sensors are ultrasonic sensors used for detecting objects (e.g., park pilot sensors) (e.g., as described above with reference to FIGS. 4A-4B). In some examples, a flood concern is detected when the two or more sensors used to detect the flood concern are located at the front fascia of the vehicle (e.g., on the front bumper of the vehicle) (e.g., as described above with reference to FIGS. 4A-4B). In some examples, a flood concern is detected when the two or more sensors detecting acoustic impedance between the first threshold value and the second threshold value are located at the back fascia of the vehicle (e.g., on the back bumper of the vehicle) (e.g., as described above with reference to FIG. 4B). In some examples, a flood concern is detected when the two or more sensors detecting acoustic impedance between the first threshold value and the second threshold value are adjacent. In some examples, a flood concern is detected when the two or more sensors detecting acoustic impedance between the first threshold value and the second threshold value are on the same side of the vehicle (e.g., both on the right side or both the left side of the vehicle).

At step 520, process 500 executes a precautionary measure in response to detecting the flood concern at step 510. In some embodiments, the precautionary measure comprises sending a warning notification (e.g., message) to a user (e.g., driver, passenger, owner, or other person). In some embodiments, the notification can be a visual, haptic, and/or audio alert to the user. In some embodiments, the notification can be on any of the vehicle's display system(s) (e.g., the control, entertainment, infotainment, and/or heads up display system(s)) (e.g. as described above with reference to FIG. 1), a smartphone, or any other electronic device with a display. In some embodiments, the process 500 can provide an audible notification through the vehicle's speaker(s) or any other sound source in the vehicle (e.g., as described with reference to FIG. 1). In some embodiments, the notification can be a phone call, text message, email, or any form of electronic or audible/visual communication to an electronic device (e.g., an electronic device associated with the owner, driver, passenger, or any other person). In some embodiments, the notification includes information about the flood concern (e.g., the area of the car at which the water was detected, the amount of time the water has been detected, information related to the height of the detected water (e.g., information related to the height of the sensors detecting the water). In some embodiments, the notification can include an affordance (e.g., a user interface) for the user to manually invoke any of the precautionary measures disclosed in the present invention (e.g., a user interface).

Additionally or alternatively, in some embodiments, the precautionary measure comprises automatically raising the ride height (e.g., raise the suspension height of the vehicle through the suspension set up 135 as described above with reference to FIG. 1) to help prevent water from entering the engine area and/or the vehicle cabin. In some embodiments, process 500 will also notify the user (e.g., driver, passenger, or any other person) that the ride height is being raised (e.g., as described above).

Additionally or alternatively, in some embodiments, the precautionary measure comprises automatically shutting one or more louvers of the vehicle (e.g., as descried above with reference to FIGS. 1 and 4) to help prevent water from entering the engine area. In some embodiments, process 500 will also notify the user (e.g., driver, passenger, or any other person) that the one or more louvers are being closed (e.g., as described above).

Additionally or alternatively, in some embodiments, the precautionary measure comprises creating positive air pressure inside the cabin (e.g., to keep or help push water out of the cabin). For example, process 500 can close one or more openings that would let air out of the cabin such as the windows, vents, air extractors. In some embodiments, process 500 will also notify the user (e.g., driver, passenger, or any other person) that the one or more openings are being closed (e.g., as described above).

Additionally or alternatively, in some embodiments, the precautionary measure comprises transmitting the flood concern (e.g., through vehicle-to-vehicle, Internet, cellular, radio, or any other wireless communication channels and/or technologies) to an outside source (e.g., a server, another vehicle). For example, process 500 can determine the vehicle's current location (e.g., as described above with reference to FIGS. 1 and 4) and transmit the flood concern (e.g., through vehicle-to-vehicle, Internet, cellular, radio, or any other wireless communication channels and/or technologies) to one or more other vehicles within a threshold distance from the vehicle's current location (e.g., vehicles traveling along the same road). In this way, other vehicles can avoid a potentially flood area.

In some embodiments, the user can manually invoke any of the precautionary measures disclosed in the present invention through a control system such as a button, a touch screen, a voice command, a computer, a smartphone, or any device or system that allows user input to be entered. In some embodiments, any of the precautionary measures described in the present invention can be overridden (e.g., caused not to be executed) by the user including via a UI element on any of the vehicle's display system(s) or a smartphone application.

At step 530, process 500 determines whether the flood concern is detected for longer than a threshold period of time (e.g., time threshold longer than the threshold period of time used to detect the flood concern at step 510) (e.g., 30 seconds, 10 minutes, 20 minutes, or any amount of time). If the flood concern is detected for longer than a threshold period of time, process 500 continues to step 540. If the flood concern is not detected for longer than a threshold period of time, process 500 continues to step 550.

At step 540, process 500 executes additional precautionary measures. In some embodiments, when an additional precautionary measure is executed, process 500 sets a new threshold period of time to be used at step 530. For example, step 540 may be performed after process 500 determines, at step 530, the flood concern is detected for longer than a first threshold period of time (e.g., 30 seconds, 5 minutes). Process 500 may then set, at step 540, a second threshold period of time (e.g., 10 minutes, 15 minutes) in case step 530 is performed again (e.g., in case process 500 continues back to step 530 after performing step 550). In this way, the next time step 530 is performed, process 500 will determine whether the flood concern is detected for longer than a second threshold period of time (e.g., longer than the first threshold period of time). It should be understood that additional threshold periods of time (e.g., a third threshold period of time, fourth threshold period of time, etc.) can be used, each set to an incrementally longer period of time. In this way, process 500 can progressively take additional precautionary measures as a flooding condition persists.

In some embodiments, the additional precautionary measures comprise degrading power to one or more actuator system of the vehicle (e.g., as described above with reference to FIG. 1). For example, process 500 can reduce power to the motor 131 and/or engine 132. In this way, process 500 can prevent the water from damming at the front or back of the vehicle (e.g., depending on the driving direction of the vehicle) by preventing the vehicle from accelerating too quickly. In some examples, process 500 can progressively reduce power to the motor and/or engine every time step 540 is performed. For example, process 500 can invoke a "limp" mode (e.g., a reduced power mode) the first time step 540 is performed, process 500 can invoke a "crawl" mode (e.g., a reduced power mode lower than the limp mode) the second time step 540 is performed, and process 500 can invoke a "stop" mode the third time step 540 is performed. In some embodiments, the stop mode causes the vehicle to automatically pull over and stop or simply stop at its current location. In some embodiments, process 500 will also notify the user (e.g., driver, passenger, or any other person) of any power reduction, including whether a particular power is invoked (e.g., as described above).

Additionally or alternatively, in other embodiments, the additional precautionary measures can comprise preventing the vehicle from driving faster than a threshold speed (e.g., 20 miles-per-hour). In some embodiments, process 500 will also notify the user (e.g., driver, passenger, or any other person) that the vehicle is being prevented from driving faster than the threshold speed (e.g., as described above).

Additionally or alternatively, in some embodiments, the additional precautionary measure comprises transmitting the flood concern (e.g., through vehicle-to-vehicle, Internet, cellular, radio, or any other wireless communication channels and/or technologies) to a third party (e.g., another system external to the vehicle). For example, process 500 can determine the vehicle's current location (e.g., as described above with reference to FIGS. 1 and 4) and transmit the flood concern (e.g., through vehicle-to-vehicle, Internet, cellular, radio, or any other wireless communication channels and/or technologies) with the vehicle's current location to one or more emergency systems (e.g., OnStar, a Call Center, or any other emergency system). In some examples, the transmitted information about the flood concern can also include which sensors detected the flood concern, the duration of the flood concern, the acoustic impedance detected at the sensors, whether any water ingress (e.g., into the engine area or the cabin) occurred, precautionary measures taken (including timing information of when each of the precautionary measures were taken), information entered by a user (e.g., manually entered notes about the flood concern), or any other information about the flood concern. In this way, assistance can be dispatched to the vehicle if necessary.

Additionally or alternatively, in some embodiments, the additional precautionary measure can comprise entering a semi-autonomous driving mode (e.g., from an autonomous driving mode) or entering a manual driving mode (e.g., from an autonomous or semi-autonomous driving mode). In some embodiments, process 500 will also notify the user (e.g., driver, passenger, or any other person) that the vehicle is entering the semi-autonomous or manual driving mode (e.g., as described above).

At step 550, process 500 determines whether the flood concern is resolved. In some embodiments, process 500 determines that the flood concern is resolved by no longer detecting high acoustic impedance between the first threshold value and the second threshold value (e.g., the detected acoustic impedance is no longer between 1 and 2 MPa-s/m$^3$) at the two or more sensors. In some embodiments, process 500 determines that the flood concern is resolved by not detecting acoustic impedance between the first threshold value and the second threshold value (e.g., the detected acoustic impedance is no longer between 1 and 2 MPa-s/m$^3$) at the two or more sensors for a threshold period of time (e.g., either the same or different threshold period of time than used in step 510). In some embodiments, a user (e.g., driver, passenger, owner, or any other person) can enter an input (e.g., through a control system such as a button, a touch screen, a voice command, a computer, a smartphone, or any device or system that allows user input to be entered) indicating that the flood concern has been resolved. In accordance with a determination that the flood concern has been resolved, process 500 continues to step 560. In accordance with a determination that the flood concern has not been resolved, process 500 returns to step 530.

At step 560, process 500 records information about the flood concern based on information from the two or more sensors that detected the flood concern. For example, the process 500 can record information about which sensors detected the flood concern, the duration of the flood concern, the acoustic impedance detected at the sensors, the location of the flood concern, whether any water ingress (e.g., into the engine area or the cabin) was detected, precautionary measures taken (including timing information of when each of the precautionary measures were taken), information about how the flood concern was resolved, information entered by a user (e.g., manually entered notes about the flood concern), or any other information about the flood concern. In some embodiments, the information about the flood concern is stored locally (e.g., in the memory of the vehicle's onboard computer) or on a remote server (e.g., through Internet, cellular, radio, or any other wireless communication channels and/or technologies). In some embodiments, the recorded information comprises a report generated by process 500 at step 560.

In some embodiments, step 550 can be performed after step 530 and before step 530. In some examples, step 430 can be performed after step 410 and before step 420.

Thus, the examples of the disclosure provide various ways to provide water ingress protection to vehicles.

Therefore, according to the above, some examples of the disclosure are directed to a system for use in a vehicle, the system comprising: a plurality of sensors located on a front fascia of the vehicle and on a back fascia of the vehicle; one or more processors coupled to the plurality of sensors; and a memory including instructions, which when executed by the one or more processors, cause the one or more processors to perform a method comprising the steps of: detecting a first acoustic impedance at a first sensor of the plurality of sensors while detecting a second acoustic impedance at a second sensor of the plurality of sensors; in accordance with a determination that the first acoustic impedance and the second acoustic impedance are between a first threshold impedance and a second threshold impedance for at least a first threshold period of time, executing a first precautionary measure; and in accordance with a determination that the first acoustic impedance and the second acoustic impedance are not between the first threshold impedance and the second threshold impedance for at least the first threshold period of time, forgoing executing the first precautionary measure. Additionally or alternatively to one or more of the examples disclosed above, in some examples, the first and second sensors are ultrasonic sensors. Additionally or alternatively to one or more of the examples disclosed above, in some examples, the first and second sensors are park sensors. Additionally or alternatively to one or more of the examples disclosed above, in some examples, the first and source sensors are both located on the front fascia of the vehicle. Additionally or alternatively to one or more of the examples disclosed above, in some examples, the first and source sensors are both located on the back fascia of the vehicle. Additionally or alternatively to one or more of the examples disclosed above, in some examples, the first and source sensors are adjacent to each other on the vehicle. Additionally or alternatively to one or more of the examples disclosed above, in some examples, the first precautionary measure comprises sending a warning notification to a display of the vehicle. Additionally or alternatively to one or more of the examples disclosed above, in some examples, the first precautionary measure comprises raising a suspension height of the vehicle. Additionally or alternatively to one or more of the examples disclosed above, in some examples, the first precautionary measure comprises shutting one or more louvers of the vehicle. Additionally or alternatively to one or more of the examples disclosed above, in some examples, the first precautionary measure comprises creating positive air pressure in a cabin of the vehicle. Additionally or alternatively to one or more of the examples disclosed above, in some examples, in accordance with a determination that the first acoustic impedance and the second acoustic impedance are between the first threshold impedance and the second threshold impedance for at least a second threshold period of time, longer than the first threshold period of time, executing a second precautionary measure, different than the first precautionary measure; and in accordance with a determination that the first acoustic impedance and the second acoustic impedance are not between the first threshold impedance and the second threshold impedance for at least the second threshold period of time, forgoing executing the second precautionary measure. Additionally or alternatively to one or more of the examples disclosed above, in some examples, in accordance with a determination that the first acoustic impedance and the second acoustic impedance are between the first threshold impedance and the second threshold impedance for at least a third threshold period of time, longer than the first and second thresholds period of time, executing a third precautionary measure; and in accordance with a determination that the first acoustic impedance and the second acoustic impedance are not between the first threshold impedance and the second threshold impedance for at least the second threshold period of time, forgoing executing the second precautionary measure. Additionally or alternatively to one or more of the examples disclosed above, in some examples, the second precautionary measure comprises degrading power to one or more actuator system of the vehicle. Additionally or alternatively to one or more of the examples disclosed above, in some examples, the second precautionary measure further comprises sending a first notification to the display of the vehicle indicating that the system is degrading power to the one or more actuator system of the vehicle. Additionally or alternatively to one or more of the examples disclosed above, in some examples, the third precautionary measure comprises further degrading power to one or more actuator system of the vehicle. Additionally or alternatively to one or more of the examples disclosed above, in some examples, the third precautionary measure further comprises sending a second notification to the display of the vehicle indicating that the system is further degrading power to the one or more actuator system of the vehicle. Additionally or alternatively to one or more of the examples disclosed above, in some examples, the second precautionary measure further comprises transmitting an emergency signal to another system external to the vehicle. Additionally or alternatively to one or more of the examples disclosed above, in some examples, in accordance with a determination that the first acoustic impedance and the second acoustic impedance are no longer between the first threshold impedance and the second threshold impedance, recording information based on information from the first and second sensors; and in accordance with a determination that the first acoustic impedance and the second acoustic impedance are not between the first threshold impedance and the second threshold impedance for at least the second threshold period of time, forgoing recording the information.

Some examples of the disclosure are directed to a non-transitory computer-readable medium including instructions, which when executed by one or more processors, cause the one or more processors to perform a method comprising: detecting a first acoustic impedance at a first sensor of a plurality of sensors while detecting a second acoustic impedance at a second sensor of the plurality of sensors, wherein the plurality of sensors are located on a front fascia of a vehicle and on a back fascia of the vehicle; in accordance with a determination that the first acoustic impedance and the second acoustic impedance are between a first threshold impedance and a second threshold impedance for at least a first threshold period of time, executing a first precautionary measure; and in accordance with a determination that the first acoustic impedance and the second acoustic impedance are not between the first threshold impedance and the second threshold impedance for at least the first threshold period of time, forgoing executing the first precautionary measure.

Some examples of the disclosure are directed to a method comprising: detecting a first acoustic impedance at a first sensor of a plurality of sensors while detecting a second acoustic impedance at a second sensor of the plurality of sensors, wherein the plurality of sensors are located on a front fascia of a vehicle and on a back fascia of the vehicle; in accordance with a determination that the first acoustic impedance and the second acoustic impedance are between a first threshold impedance and a second threshold impedance for at least a first threshold period of time, executing a first precautionary measure; and in accordance with a determination that the first acoustic impedance and the second acoustic impedance are not between the first threshold impedance and the second threshold impedance for at least the first threshold period of time, forgoing executing the first precautionary measure.

Although examples have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A system for use in a vehicle, the system comprising:
   a plurality of sensors located on a front fascia of the vehicle and on a back fascia of the vehicle;
   one or more processors coupled to the plurality of sensors; and
   a memory including instructions, which when executed by the one or more processors, cause the one or more processors to perform a method comprising the steps of:
      detecting a first acoustic impedance at a first sensor of the plurality of sensors while detecting a second acoustic impedance at a second sensor of the plurality of sensors;
      in accordance with a determination that the first acoustic impedance and the second acoustic impedance are between a first threshold impedance and a second threshold impedance for at least a first threshold period of time, executing a first precautionary measure; and
      in accordance with a determination that the first acoustic impedance and the second acoustic impedance are not between the first threshold impedance and the second threshold impedance for at least the first threshold period of time, forgoing executing the first precautionary measure.

2. The system of claim 1, wherein the first and second sensors are ultrasonic sensors.

3. The system of claim 2, wherein the first and second sensors are park pilot sensors.

4. The system of claim 2, wherein the first and source sensors are both located on the front fascia of the vehicle.

5. The system of claim 2, wherein the first and source sensors are both located on the back fascia of the vehicle.

6. The system of claim 2, wherein the first and source sensors are adjacent to each other on the vehicle.

7. The system of claim 1, wherein the first precautionary measure comprises sending a warning notification to a display of the vehicle.

8. The system of claim 1, wherein the first precautionary measure comprises raising a suspension height of the vehicle.

9. The system of claim 1, wherein the first precautionary measure comprises shutting one or more louvers of the vehicle.

10. The system of claim 1, wherein the first precautionary measure comprises creating positive air pressure in a cabin of the vehicle.

11. The system of claim 1, further comprising:
    in accordance with a determination that the first acoustic impedance and the second acoustic impedance are between the first threshold impedance and the second threshold impedance for at least a second threshold period of time, longer than the first threshold period of time, executing a second precautionary measure, different than the first precautionary measure; and in accordance with a determination that the first acoustic impedance and the second acoustic impedance are not between the first threshold impedance and the second threshold impedance for at least the second threshold period of time, forgoing executing the second precautionary measure.

12. The system of claim 11, further comprising:
    in accordance with a determination that the first acoustic impedance and the second acoustic impedance are between the first threshold impedance and the second threshold impedance for at least a third threshold period of time, longer than the first and second thresholds period of time, executing a third precautionary measure; and
    in accordance with a determination that the first acoustic impedance and the second acoustic impedance are not between the first threshold impedance and the second threshold impedance for at least the second threshold period of time, forgoing executing the second precautionary measure.

13. The system of claim 11, wherein the second precautionary measure comprises degrading power to one or more actuator system of the vehicle.

14. The system of claim 13, wherein the second precautionary measure further comprises sending a first notification to a display of the vehicle indicating that the system is degrading power to the one or more actuator system of the vehicle.

15. The system of claim 13, wherein a third precautionary measure comprises further degrading power to one or more actuator system of the vehicle.

16. The system of claim 15, wherein the third precautionary measure further comprises sending a second notification to the display of the vehicle indicating that the system is further degrading power to the one or more actuator system of the vehicle.

17. The system of claim 11, wherein the second precautionary measure further comprises transmitting an emergency signal to another system external to the vehicle.

18. The system of claim 11, further comprising:
    in accordance with a determination that the first acoustic impedance and the second acoustic impedance are no longer between the first threshold impedance and the second threshold impedance, recording information based on information from the first and second sensors; and in accordance with a determination that the first acoustic impedance and the second acoustic impedance are not between the first threshold impedance and the second threshold impedance for at least the second threshold period of time, forgoing recording the information.

19. A non-transitory computer-readable medium including instructions, which when executed by one or more processors, cause the one or more processors to perform a method comprising:
   detecting a first acoustic impedance at a first sensor of a plurality of sensors while detecting a second acoustic impedance at a second sensor of the plurality of sensors, wherein the plurality of sensors are located on a front fascia of a vehicle and on a back fascia of the vehicle;
   in accordance with a determination that the first acoustic impedance and the second acoustic impedance are between a first threshold impedance and a second threshold impedance for at least a first threshold period of time, executing a first precautionary measure; and
   in accordance with a determination that the first acoustic impedance and the second acoustic impedance are not between the first threshold impedance and the second threshold impedance for at least the first threshold period of time, forgoing executing the first precautionary measure.

20. A method comprising:
   detecting a first acoustic impedance at a first sensor of a plurality of sensors while detecting a second acoustic impedance at a second sensor of the plurality of sensors, wherein the plurality of sensors are located on a front fascia of a vehicle and on a back fascia of the vehicle;
   in accordance with a determination that the first acoustic impedance and the second acoustic impedance are between a first threshold impedance and a second threshold impedance for at least a first threshold period of time, executing a first precautionary measure; and
   in accordance with a determination that the first acoustic impedance and the second acoustic impedance are not between the first threshold impedance and the second threshold impedance for at least the first threshold period of time, forgoing executing the first precautionary measure.

* * * * *